United States Patent
Tokue (10) Patent No.: US 7,752,467 B2
(45) Date of Patent: Jul. 6, 2010

(54) INTEGRATED CIRCUIT DEVICE

(75) Inventor: Tatsuya Tokue, Kanagawa (JP)

(73) Assignee: Nec Electronics Corporation, Kanagawa (JP)

(*) Notice: Subject to any disclaimer, the term of this patent is extended or adjusted under 35 U.S.C. 154(b) by 1126 days.

(21) Appl. No.: 11/242,045

(22) Filed: Oct. 4, 2005

(65) Prior Publication Data

US 2006/0075267 A1 Apr. 6, 2006

(30) Foreign Application Priority Data

Oct. 5, 2004 (JP) .............................. 2004-292852

(51) Int. Cl.
*G06F 1/00* (2006.01)

(52) U.S. Cl. .................. 713/300; 713/320; 713/322; 713/323; 713/324; 700/90; 700/286; 700/295; 716/1; 716/17

(58) Field of Classification Search .................. 713/300, 713/320, 322, 323, 324; 700/90, 286, 295; 716/1, 17
See application file for complete search history.

(56) References Cited

U.S. PATENT DOCUMENTS

| | | | | | |
|---|---|---|---|---|---|
| 4,097,865 | A | * | 6/1978 | Jones | 327/164 |
| 5,455,923 | A | * | 10/1995 | Kaplinsky | 711/154 |
| 5,630,143 | A | * | 5/1997 | Maher et al. | 713/310 |
| 5,632,037 | A | * | 5/1997 | Maher et al. | 713/322 |
| 5,664,205 | A | * | 9/1997 | O'Brien et al. | 713/322 |
| 5,784,611 | A | * | 7/1998 | Thantrakul | 713/1 |
| 6,088,807 | A | * | 7/2000 | Maher et al. | 713/324 |
| 6,173,408 | B1 | * | 1/2001 | Jimbo et al. | 713/322 |
| 6,230,278 | B1 | * | 5/2001 | Li et al. | 713/324 |
| 6,259,172 | B1 | * | 7/2001 | Lee | 307/125 |
| 6,343,363 | B1 | * | 1/2002 | Maher et al. | 713/324 |
| 6,510,525 | B1 | * | 1/2003 | Nookala et al. | 713/324 |
| 6,535,982 | B1 | * | 3/2003 | Kawabe et al. | 713/300 |
| 6,636,962 | B1 | * | 10/2003 | Sun et al. | 713/1 |
| 6,640,262 | B1 | * | 10/2003 | Uppunda et al. | 710/10 |
| 7,062,668 | B2 | * | 6/2006 | Kwahk et al. | 713/330 |
| 7,129,746 | B1 | * | 10/2006 | Balasubramanian et al. | 326/38 |
| 7,191,350 | B2 | * | 3/2007 | Tani | 713/324 |
| 7,210,030 | B2 | * | 4/2007 | Edrington et al. | 713/1 |
| 7,263,625 | B2 | * | 8/2007 | Katoh et al. | 713/330 |
| 7,266,680 | B1 | * | 9/2007 | Reinbold | 713/100 |
| 7,328,334 | B2 | * | 2/2008 | Su et al. | 713/1 |
| 7,376,854 | B2 | * | 5/2008 | Lehwalder et al. | 713/330 |
| 7,519,802 | B2 | * | 4/2009 | Wheeler et al. | 713/1 |
| 2002/0108032 | A1 | * | 8/2002 | Su et al. | 713/1 |
| 2003/0233534 | A1 | * | 12/2003 | Bernhard et al. | 713/1 |
| 2004/0181699 | A1 | * | 9/2004 | Katoh et al. | 713/300 |
| 2004/0199390 | A1 | * | 10/2004 | Lim | 704/270 |

(Continued)

FOREIGN PATENT DOCUMENTS

JP 2002-251230 A 9/2002

(Continued)

*Primary Examiner*—Thomas Lee
*Assistant Examiner*—Jaweed A Abbaszadeh
(74) *Attorney, Agent, or Firm*—Sughrue Mion, PLLC (57) ABSTRACT

The integrated circuit device includes a CPU having an arithmetic circuit and a Power Management Unit implementing power control of the CPU through a power IC. The Power Management Unit has no arithmetic circuit. The Power Management Unit includes RAM storing a plurality of commands and a control section implementing power control of the CPU according to the commands stored in the RAM.

17 Claims, 6 Drawing Sheets

U.S. PATENT DOCUMENTS

2004/0215983 A1* 10/2004 Kwahk et al. ............... 713/300
2004/0221148 A1* 11/2004 Su et al. ...................... 713/1
2005/0240687 A1* 10/2005 Hayakawa ................... 710/10
2006/0075267 A1* 4/2006 Tokue ......................... 713/300

FOREIGN PATENT DOCUMENTS

JP 2002-288150 A 10/2002
JP 2002-341976 A 11/2002

* cited by examiner

INTEGRATED CIRCUIT DEVICE

BACKGROUND OF THE INVENTION

1. Field of the Invention

The present invention relates to an integrated circuit device and, particularly, to power control of an integrated circuit.

2. Description of Related Art

Various types of large scale integrations (LSI) are incorporated in mobile phones and mobile terminals that are driven by a battery. Reduction of power consumption in LSI is very important factor to enable long time use and achieve multifunction of mobile phones and so on. Further, as LSI becomes more complex, the proportion of static consumption current or leakage current that is consumed in stop state to entire consumption current rises so high that it is not negligible in a microfabrication process of 0.13 µm or less.

In order to reduce leakage current, there is proposed a technique that divides the inside of LSI into a plurality of blocks and supplies power individually to each block, thereby stopping power supply to the block that is not necessary for operation.

Figure 6:
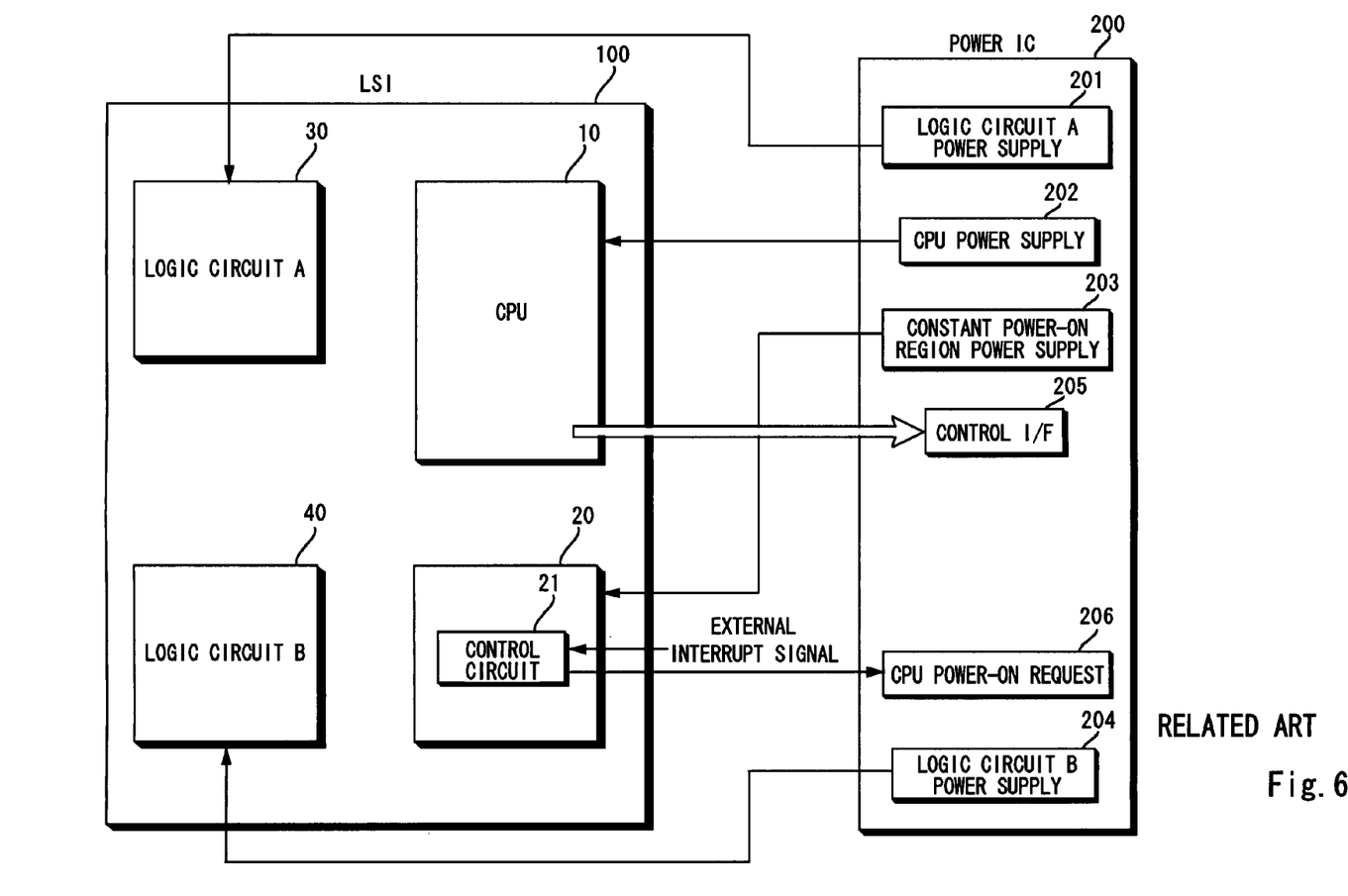
FIG. 6 is a block diagram of a conventional integrated circuit.

A conventional power control technique is described hereinafter with reference to FIG. 6. As shown in FIG. 6, LSI 100 is connected to a power IC 200. The LSI 100 has a central processor unit (CPU) 10, a constant power-on region 20, a logic circuit A 30, and a logic circuit B 40. The constant power-on region 20 is a circuit region to which power is supplied constantly in spite that other circuits such as the CPU 10 are not operating. The constant power-on region 20 has a control circuit 21 that controls power supply of the CPU 10. The control circuit 21 is implemented by a hardware fixed circuit composed of an electric circuit that does not use program and merely executes a fixed operation such as a simple power-on request, for example. The power IC 200 is a functional block that has a power supply section 201 for the logic circuit A 30, a power supply section 202 for the CPU 10, a power supply section 203 for the constant power-on region 20, a power supply section 204 for the logic circuit B 40, a control interface (I/F) 205, and a power-on request processing section 206 for the CPU 10.

A processing operation where an external interrupt signal is input to the control circuit 21 when power supply to the CPU 10 is shut off in the conventional technique shown in FIG. 6 is described hereinafter. Detecting the external interrupt signal, the control circuit 21 sends a request for power supply to the CPU 10 to the power IC 200. Since the CPU 10 in the state where power supply is shut off is initialized, it takes a long boot time when power supply is resumed. For example, a boot time takes as long as 20 to 30 seconds in some cases. Further, since the control circuit 21 is configured by hardware, it can only execute a fixed sequence and cannot deal with a complex power supply sequence. For example, it is difficult for the control circuit 21 to execute a complex power supply sequence of detecting an external interrupt signal, turning on the power of the logic circuit A 30, remaining standby for 50 µs after executing an initialization routine of the logic circuit A 30, and then turning on the power of the CPU 10. Even if such a complex power supply sequence can be executed by the hardware fixed circuit, it is not possible to execute another power supply sequence without preparation. Furthermore, placing the circuits for executing various types of power supply sequences on a hardware fixed circuit increases the circuit size.

An example of the conventional power control technique is disclosed in Japanese Unexamined Patent Publication No. 2002-341976. The integrated circuit disclosed therein implements CPU power control by a control circuit placed in an I/O terminal. However, this control circuit merely performs very simple control and a backup register also merely performs backup of each signal. Therefore, this control circuit cannot execute a complex power supply sequence and is not flexible.

Another example of the conventional power control technique is disclosed in Japanese Unexamined Patent Publication No. 2002-288150. The integrated circuit disclosed therein has both a high performance CPU and a low power consumption CPU and shuts off the power supply to the CPU that is not operating, thereby reducing leakage current and power consumption. However, since the CPU has an arithmetic circuit, a considerable amount of leakage current occurs in spite of low power consumption and the effect of reducing power consumption is small.

As described in the foregoing, it has now been discovered that the conventional integrated circuit device cannot deal with a complex power supply sequence since it implements CPU power control with a hardware fixed circuit. Further, the conventional technique that implements high performance CPU power control with a low power consumption CPU has only a small power consumption reduction effect.

SUMMARY OF THE INVENTION

According to one aspect of the present invention, there is provided an integrated circuit device that includes a processor having an arithmetic circuit and a power management unit implementing power control of the processor through a power supply section without having an arithmetic circuit. The power management unit includes a memory storing a plurality of commands and a control section implementing power control of the processor according to the commands stored in the memory. Since this integrated circuit device has the power management unit that implements power control of the processor, it is possible to issue an instruction to each peripheral macro even when no power is supplied to the processor, thereby reducing a time to restart the system. Further, the power management unit is programmable, and it is thus possible to execute various power-on/off sequences by changing the commands stored in the memory and to deal with a large number of power division splits. Furthermore, the power management unit allows easy function enhancement and change for command control. In addition, since the power management unit has no arithmetic circuit, the circuit size is significantly smaller than a processor having an arithmetic circuit, thereby achieving low power consumption.

According to another aspect of the present invention, there is provided an integrated circuit device that includes a processor having an arithmetic circuit and a programmable sequencer implementing power control of the processor through a power supply section without having an arithmetic circuit, wherein the programmable sequencer performs initialization of another circuit in the integrated circuit device in parallel with supplying power to the processor through the power supply section. This configuration allows reducing a time to restart the system.

BRIEF DESCRIPTION OF THE DRAWING

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
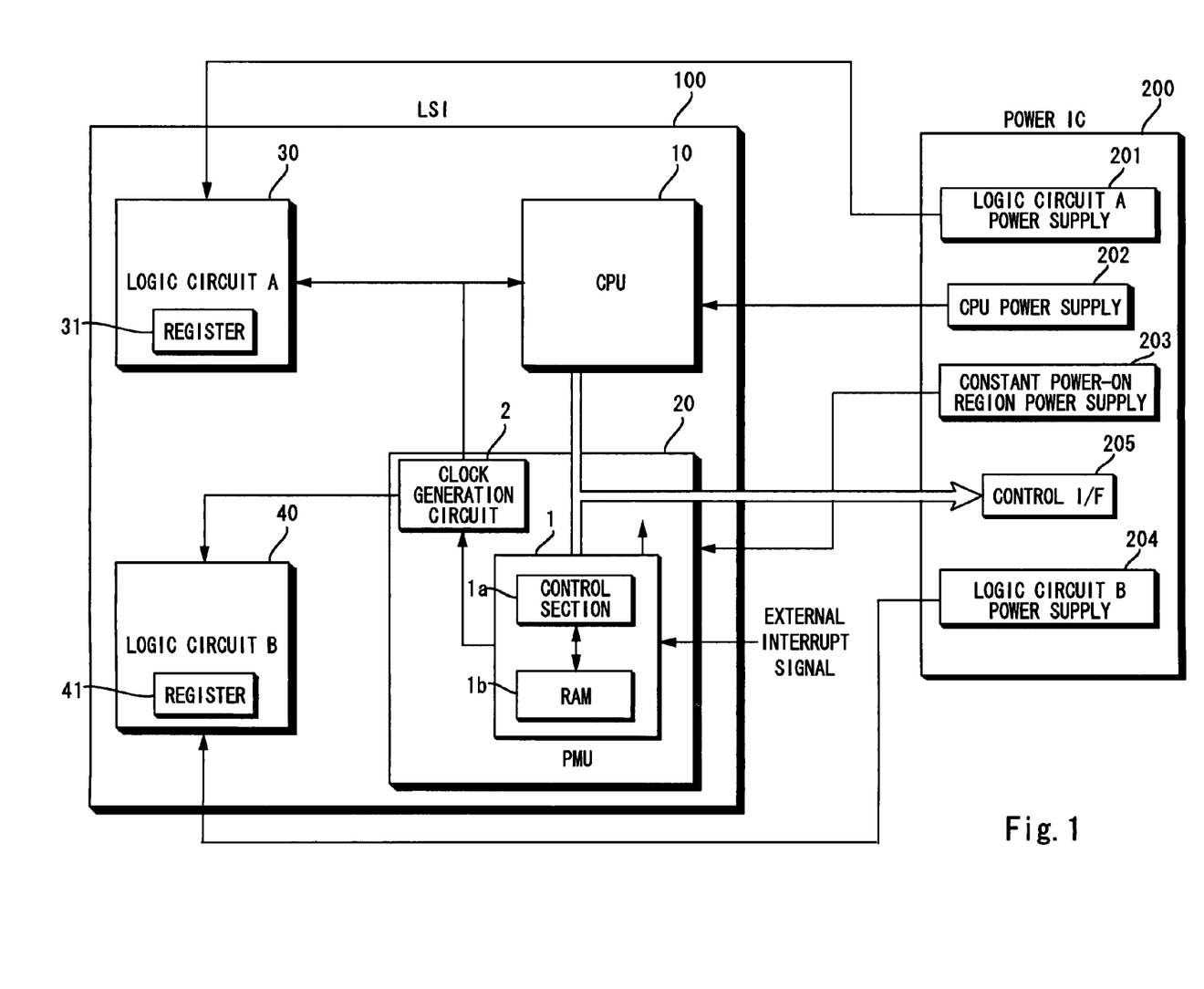
FIG. 1 is a block diagram of an integrated circuit of the present invention.

A power control technique according to a first embodiment of the invention is described hereinafter with reference to FIG. 1. As shown in FIG. 1, the integrated circuit device of this invention has a LSI 100 and a power IC 200, and it is incorporated in a mobile phone, for example, as an application processor. The LSI 100 is connected to the power IC 200 that is placed separately from the LSI 100. The LSI 100 has a CPU 10, a constant power-on region 20, a logic circuit A 30, and a logic circuit B 40. The constant power-on region 20 has a power management unit (PMU) 1 and a clock generation circuit 2. The CPU 10 has an arithmetic circuit. The CPU 10 and the PMU 1 are connected by a common bus, and signals from the CPU 10 and the PMU 1 are selectively supplied to the power IC 200 through the bus. It is feasible to place a selector for switching signals from the CPU 10 and the PMU 1.

The PMU 1 has functions to control power supply to the CPU 10, the logic circuit A 30, the logic circuit B 40 and so on and to control operation of the clock generation circuit 2 and a reset control circuit (not shown). The PMU 1 has a control section 1a and random access memory (RAM) 1b. The control section 1a is configured by an electric circuit that has no arithmetic circuit and operates according to a command sequence or program composed of a plurality of commands stored in the RAM 1b. Thus, the PMU 1 is a programmable sequencer, which is capable of executing various power on/off sequences by changing the commands stored in the RAM 1b and dealing with a large number of power division splits. Further, the PMU 1 allows easy function enhancement and change for command control.

The PMU 1 can issue an instruction to each peripheral macro, such as the logic circuit A 30 and the logic circuit B 40 even when no power is supplied to the CPU 10. Thus, the PMU 1 can control each peripheral macro when power is not supplied to the CPU 10. It is therefore possible to execute various instructions while the CPU 10 performs resume processing after power is supplied to the CPU 10 or before it performs resume processing, thereby reducing a time required to restart the system.

Further, the PMU 1 has an interrupt monitor function and it can execute power-on sequence in response to input of an external interrupt signal. The PMU 1 also has a watchdog timer function and can deal with system hang-up by reset processing. The PMU 1 of the first embodiment of the invention is a specialized programmable sequencer for power control and has no arithmetic circuit. Thus, the PMU 1 has a significantly small size, which is about ⅟10 to ⅟50, compared with a processor having an arithmetic circuit. Therefore, use of the PMU 1 allows lower power consumption than use of the processor. A specific configuration of the PMU 1 is detailed later.

The clock generation circuit 2 generates and supplies a clock signal to the CPU 10, the logic circuit A 30, the logic circuit B 40 and so on. The clock generation circuit 2 is configured by a normal phase lock loop (PLL) circuit and has an oscillator circuit.

The power IC 200 functions as a power supply section that supplies power to the LSI 100. The power IC 200 is a functional block that has a power supply section 201 for the logic circuit A 30, a power supply section 202 for the CPU 10, a power supply section 203 for the constant power-on region 20, a power supply section 204 for the logic circuit B 40, and a control interface (I/F) 205.

Figure 2:
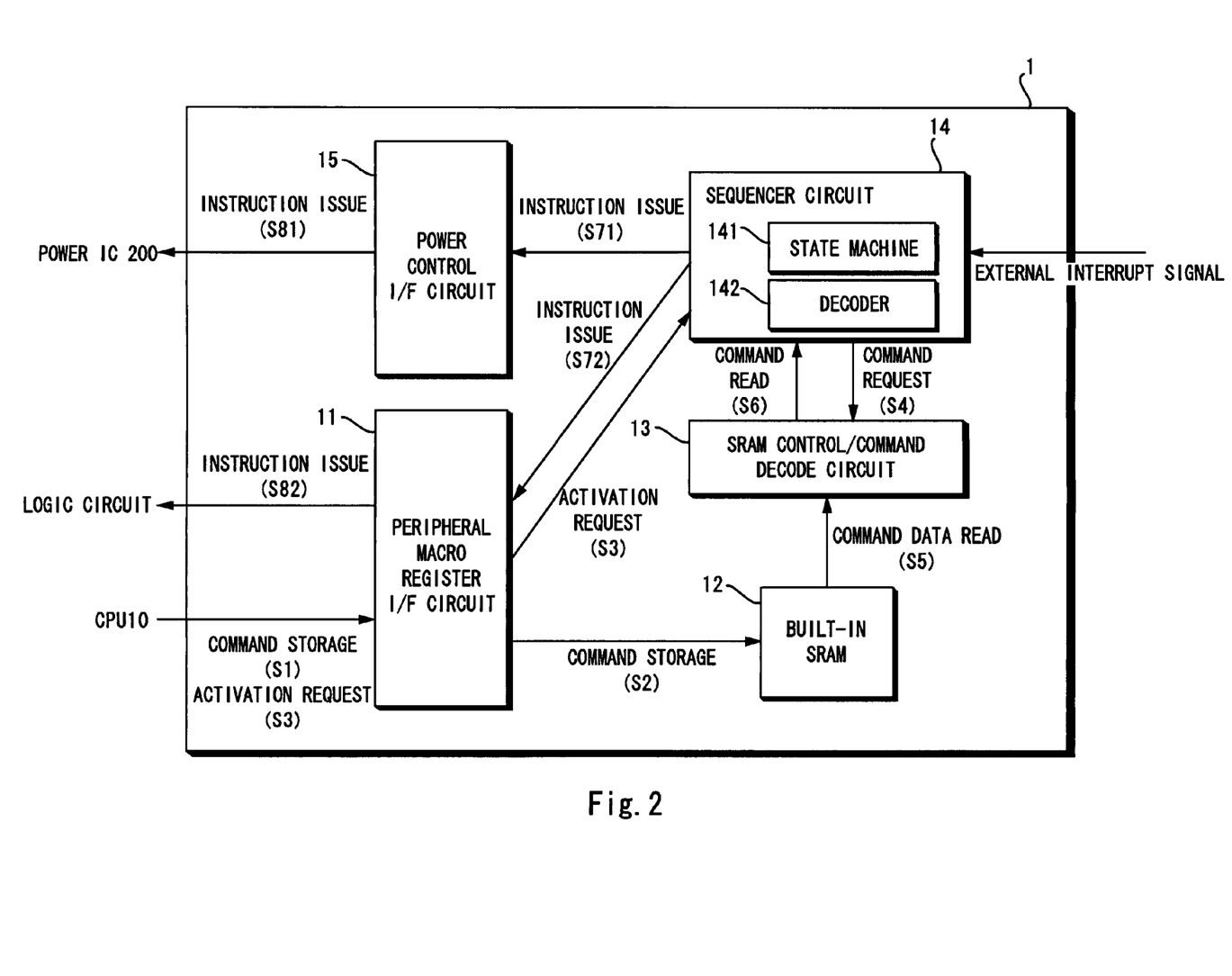
FIG. 2 is an internal block diagram of a PMU macro in an integrated circuit of the present invention.

The internal block of the PMU 1 is described hereinafter in detail with reference to FIG. 2. The PMU 1 has a peripheral macro register interface (I/F) circuit 11, a built-in SRAM 12, a SRAM control/command decode circuit 13, a sequencer circuit 14, and a power control interface (I/F) circuit 15.

The peripheral macro register I/F circuit 11 is connected to the CPU 10, the logic circuit A 30, and the logic circuit B 40 and converts communication protocols in order to perform communication between the CPU 10 and so on and the macros in the PMU 1 such as the built-in SRAM 12 and the sequencer circuit 14. The peripheral macro register I/F circuit 11 converts protocols to an I/F bus protocol when transmitting data or command from each macro in the PMU 1 to the CPU 10 or the like.

The built-in SRAM 12 is a memory that corresponds to the RAM 1b shown in FIG. 1. It is a storage means that stores a command sequence or program composed of a plurality of commands in readable and writable form.

The SRAM control/command decode circuit 13 controls the built-in SRAM 12. The SRAM control/command decode circuit 13 reads out a command stored in the built-in SRAM 12 in response to a command request from the sequencer circuit 14, decodes the command, and outputs it to the sequencer circuit 14.

The sequencer circuit 14 is composed of a state machine 141 and a decoder 142. The sequencer circuit 14 of this invention has no arithmetic circuit. The state machine 141 is a circuit that shifts the internal state in synchronization with a command. The internal states shifted by the state machine 141 involve an external power-on instruction issue state, a peripheral micro register write state, and an external power stabilization wait state, for example. The state machine 141 is configured based on Johnson counter and performs sequence control by changing the internal state sequentially according to external signals. The decoder 142 decodes the internal state that is shifted in the state machine 141 to issue an instruction and generate an instruction request signal.

The power control I/F circuit 15 converts a protocol of an instruction (command) into an I/F bus protocol of the power IC 200 in order to issue the instruction to the power IC 200.

Figure 3:
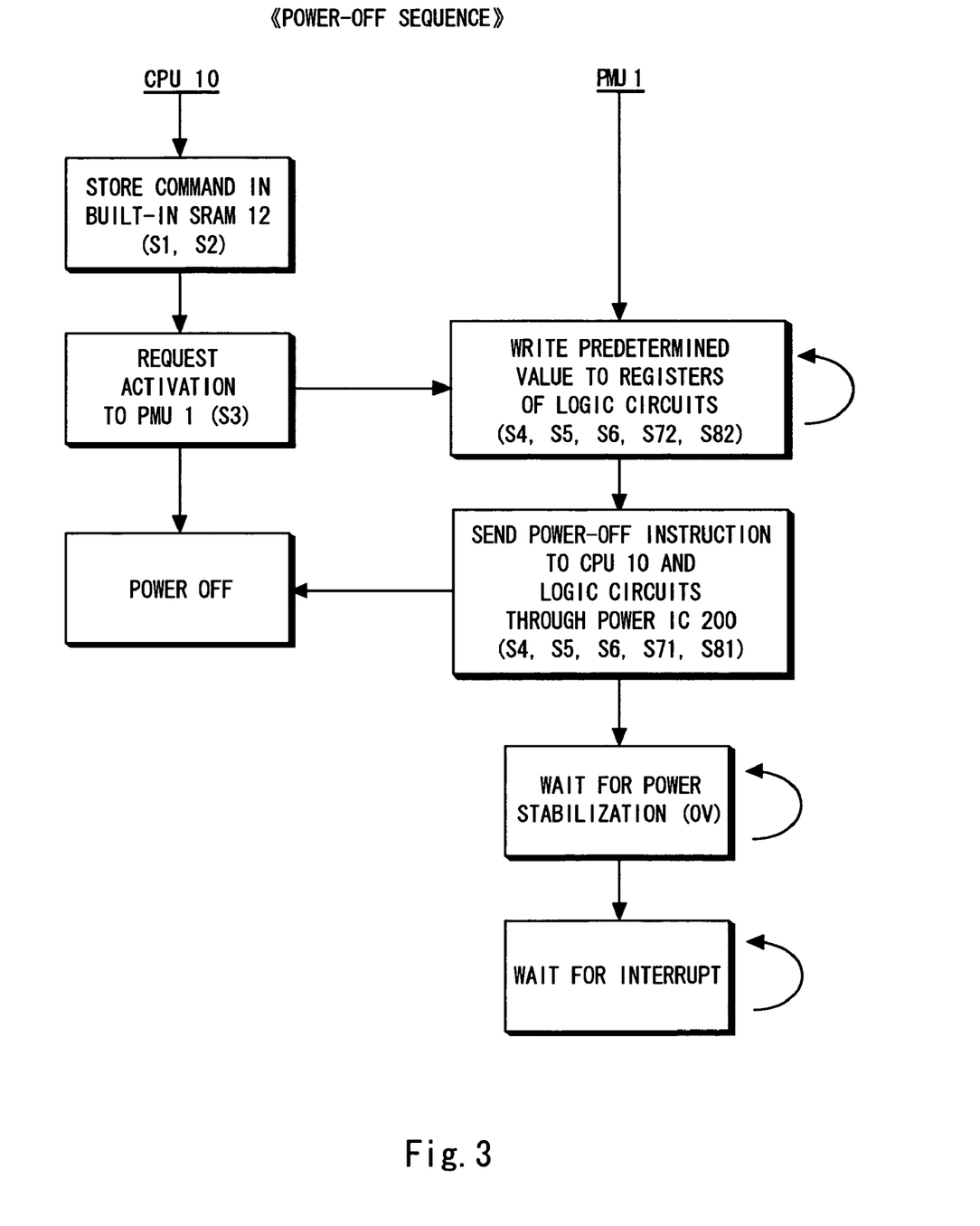
FIG. 3 is a flowchart showing a power-off sequence in an integrated circuit of the present invention.

A power-off sequence is described hereinafter with reference to the flowchart of FIG. 3. Steps S1 to S82 shown in the flowchart of FIG. 3 correspond to S1 to S82 shown in FIG. 2, respectively.

First, the CPU 10 stores a command into the built-in SRAM 12 (S1, S2). Specifically, the CPU 10 sends a command storage request to the PMU 1 (S1), and the PMU 1 performs protocol conversion on the command storage request by the peripheral macro register I/F circuit 11 and stores the protocol-converted command into a predetermined area of the built-in SRAM 12 (S2).

Then, the CPU 10 issues an activation request to the PMU 1 (S3). Receiving the activation request, the PMU 1 converts the protocol of the activation request by the peripheral macro register I/F circuit 11 and outputs the protocol-converted activation request to the sequencer circuit 14 (S3). The sequencer circuit 14 then sends a command request to the SRAM control/command decode circuit 13 in order to perform a processing according to the activation request by the state machine 141 (S4). In response to the command request, the SRAM control/command decode circuit 13 reads out command data to be processed upon receiving the activation request from the built-in SRAM 12 (S5). The SRAM control/command decode circuit 13 receives the read command data, decodes the data and then sends it to the sequencer circuit 14.

In this example, the sequencer circuit 14 writes a predetermined value stored in the built-in SRAM 12 to registers 31 and 41 of the logic circuit A 30 and the logic circuit B 40, respectively, according to the command data. The values written to the registers 31 and 41 include a value for changing a clock frequency, a value for reset, and a value for changing modes. To perform this processing, the sequencer circuit 14 issues an instruction for writing a predetermined value to the registers 31 and 41 and sends it to the peripheral macro register I/F circuit 11 (S72). The peripheral macro register I/F circuit 11 converts a protocol of the issued instruction into an I/F bus protocol and sends it to the logic circuits A 30 and B 40 (S82). In response to the instruction, the logic circuits A 30 and B 40 write the predetermined value to the registers 31 and 41, respectively.

After that, the sequencer circuit 14 sends a power-off instruction to the CPU 10 and the logic circuits A 30 and B 40 through the power IC 200 (S4, S5, S6, S71, S81). Specifically, the state machine 141 of the sequencer circuit 14 requests a command to be processed when receiving a power-off instruction to the SRAM control/command decode circuit 13 (S4). In response to the command request, the SRAM control/command decode circuit 13 reads out the command to be processed when receiving a power-off instruction from the built-in SRAM 12 (S5) and supplies it to the sequencer circuit 14 (S6). The sequencer circuit 14 decodes it by the decoder 142 and issues an instruction by the state machine 141 according to the command to be processed when receiving the power-off instruction (S71). The instruction in this case is a power-off instruction to the CPU 10 and the logic circuits A 30 and B 40. The power control I/F circuit 15 converts the protocol of the issued instruction into a bus protocol and supplies it to the power IC 200 (S81).

The power IC 200 performs protocol conversion on the power-off instruction by the control I/F 205 and supplies it to the CPU power supply section 202, the logic circuit A power supply section 201, and the logic circuit B power supply section 204. The CPU power supply section 202, the logic circuit A power supply section 201, and the logic circuit B power supply section 204 thereby shut off power supply to the CPU 10, the logic circuit A 30, and the logic circuit B 40, respectively. Power supply to the CPU 10 and so on stops in response to the power-off instruction and the CPU 10 and so on thereby enter power-off state.

After that, the PMU 1 waits for power to be stabilized at 0V. Then, the PMU 1 further waits for an external interrupt signal to be input.

A power-on sequence is described hereinafter with reference to the flowchart of FIG. 4. Steps S4 to S82 described in the flowchart of FIG. 4 correspond to S4 to S82 described in FIG. 2, respectively.

It is assumed that the PMU 1 detects an external interrupt signal when the CPU 10 is in off-state where no power is supplied thereto. In the PMU 1, the sequencer circuit 14 directly detects the external interrupt signal. In response to the detection of the external interrupt signal, the state machine 141 of the sequencer circuit 14 requests a command to be processed when detecting an external interrupt signal to the SRAM control/command decode circuit 13 (S4). The SRAM control/command decode circuit 13 thereby reads out a command corresponding to the command request from the built-in SRAM 12 (S5) and supplies it to the sequencer circuit 14 (S6). The sequencer circuit 14 recognizes that the command is a power-on instruction by the decoder 142 and issues a power-on instruction by the state machine 141 (S71). The power control I/F circuit 15 converts the protocol of the issued power-on instruction into a path communication protocol and supplies it to the power IC 200 (S81). The power IC 200 performs protocol conversion on the power-on instruction by the control I/F 205 and supplies it to the CPU power supply section 202, the logic circuit A power supply section 201, and the logic circuit B power supply section 204. The CPU power supply section 202, the logic circuit A power supply section 201, and the logic circuit B power supply section 204 thereby supply power to the CPU 10, the logic circuit A 30, and the logic circuit B 40, respectively. The PMU 1 controls power supply so as to supply power only to the area where operation needs to be performed. Therefore, no power is supplied to the area where operation is not performed, thereby saving power consumption.

Figure 4:
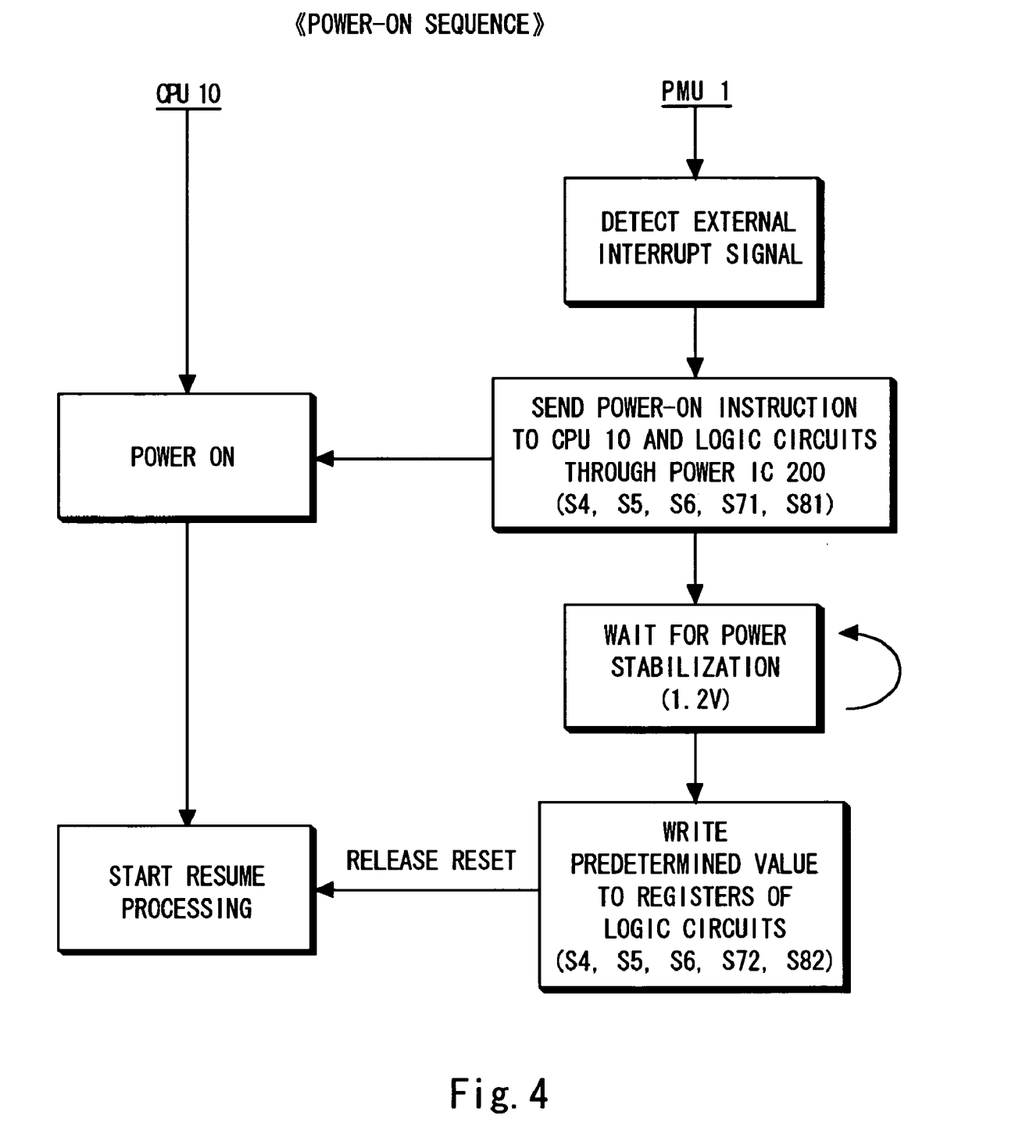
FIG. 4 is a flowchart showing a power-on sequence in an integrated circuit of the present invention.

The CPU 10 enters power-on state as shown in the flowchart of FIG. 4. In this example, power of 1.2V is applied to the CPU 10, and the sequencer circuit 14 of the PMU 1 waits for power to be stabilized at 1.2V. When power is stabilized at 1.2V after a certain time has passed, the state machine 141 of the sequencer circuit 14 writes an initial value to the register 31 of the logic circuit A 30 and the register 41 of the logic circuit B 40.

Specifically, recognizing that power is stabilized at 1.2V, the state machine 141 of the sequencer circuit 14 requests a command to the SRAM control/command decode circuit 13 (S4).

In response to the command request, the SRAM control/command decode circuit 13 reads command data from the built-in SRAM 12, decodes the data, and supplies it to the sequencer circuit 14. The sequencer circuit 14 decodes the input command by the decoder 142 and issues an instruction (S72). In this case, a command for writing an initial value to the register 31 of the logic circuit A 30 and the register 41 of the logic circuit B 40 is issued. This command contains initial value data. The peripheral macro register I/F circuit 11 converts the protocol of the command into a bus communication protocol and supplies it to the logic circuit A 30 and the logic circuit B 40. The logic circuit A 30 and the logic circuit B 40 write an initial value to the register 31 and the register 41, respectively, according to the input command. In the conventional technique, the setting of the initial value to the register 31 of the logic circuit A 30 and the register 41 of the logic circuit B 40 is performed by the CPU 10. However, if the PMU 1 performs this setting, it is possible to set the initial value before power is supplied to the CPU 10. This allows reduction of a processing time to restart the system.

Further, the PMU 1 releases reset on the CPU 10 through a reset generation circuit (not shown) placed in the constant power-on region 20. The CPU 10 thereby starts resume processing. Thus, since both the CPU 10 and the PMU 1 can perform various processing in parallel during power-on sequence where power supply to the CPU 10 is started, it is possible to reduce a time to restart the system from 20 to 30 seconds to approximately 1 millisecond, for example. For example, it is assumed that the integrated circuit of the first embodiment of the invention is incorporated in a mobile phone. If the mobile phone receives a phone call, the PMU 1 controls the power IC 200 so as to supply power to the macro related to phonetic function such as digital signal processor (DSP). It is thereby possible to perform initialization and issue an operation start instruction without waiting for resume processing of the CPU 10 to be finished.

The PMU 1 may issue an instruction to change a clock frequency to the clock generation circuit 2. For example, the PMU 1 issues an instruction for changing a clock frequency to be supplied to the CPU 10 from a relatively low frequency to a higher frequency (for example, 200 MHz) to the clock generation circuit 2. The clock generation circuit 2 generates a high frequency clock in response to the instruction and supplies it to the CPU 10. Particularly, since the clock generation circuit 2 requires 500 microseconds, for example, after changing the frequency until it is stabilized, changing the frequency by the PMU 1 is effective in reducing a time to restart the system. The clock generation circuit 2 is placed in the constant power-on region 20 and thus supplied with power; however, the oscillator circuit is in stop state if there is no need to supply a clock to the CPU 10 or the like.

As described in the foregoing, the PMU 1 of the first embodiment of the invention is programmable, and it is capable of executing various power-on/off sequences by changing commands stored in the RAM 1b and it can deal with a large number of power division splits. Further, the PMU 1 allows easy function enhancement and change for command control.

Furthermore, the PMU 1 can issue an instruction to each peripheral macro when no power is supplied to the CPU 10. It is therefore possible to execute various instructions while the CPU 10 performs resume processing after power is supplied to the CPU 10 or before it performs resume processing, thereby reducing a time required to restart the system.

In addition, the PMU 1 is a specialized programmable sequencer for power control and has no arithmetic circuit. Thus, the circuit size is significantly smaller than a processor having an arithmetic circuit, thereby achieving low power consumption.

Second Embodiment

Figure 5:
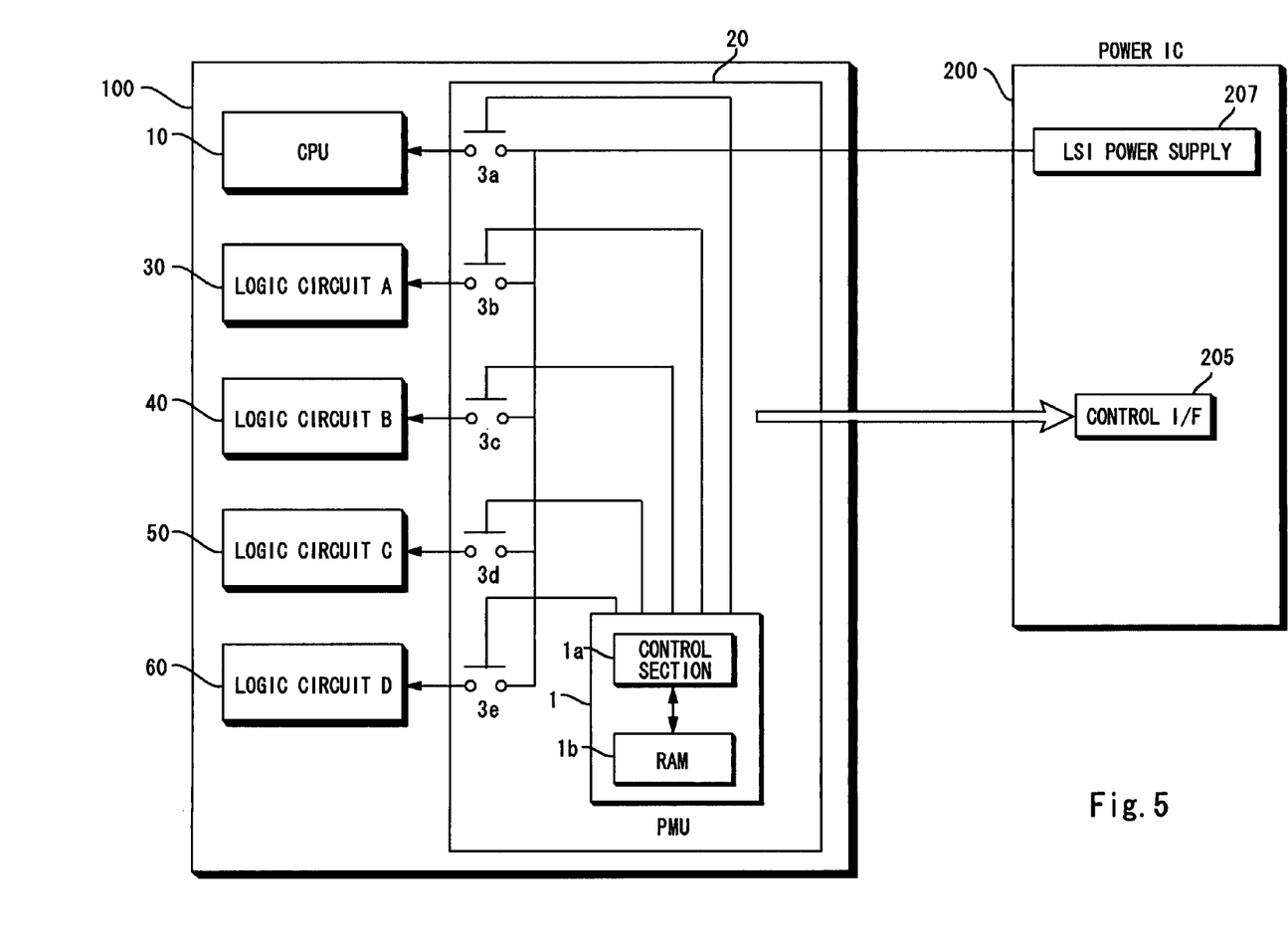
FIG. 5 is a block diagram of an integrated circuit of the present invention.

A power control technique according to a second embodiment of the invention is described hereinafter with reference to FIG. 5. The second embodiment has power supply switches 3a, 3b, 3c, 3d and 3e that correspond to macros placed inside the LSI 100, and the PMU 1 controls on/off of the power switches 3a to 3e.

Specifically, the power switches 3a to 3e are placed on branch lines that diverge from a line through which power is supplied constantly from the power IC 200 and are connected to each of the CPU 10 and logic circuits A 30, B 40, C 50 and D 60. Power is supplied from a LSI power supply section 207 of the power IC 200 to the CPU 10 through the power switch 3a. Similarly, power is supplied to the logic circuit A 30 through the power switch 3b, to the logic circuit B 40 through the power switch 3c, to the logic circuit C 50 through the power switch 3d, and to the logic circuit D 60 through the power switch 3e. The power switches 3a, 3b, 3c, 3d and 3e are placed in the constant power-on region 20 and on/off controlled by the PMU 1. Thus, the PMU 1 can perform power control on each macro of the LSI 100 without through the power IC 200, and it is thereby possible to reduce the number of power supplies of the power IC 200 placed outside the LSI 100.

It is apparent that the present invention is not limited to the above embodiment and it may be modified and changed without departing from the scope and spirit of the invention.

What is claimed is:

1. An integrated circuit device comprising:
a processor having an arithmetic circuit; and
a power management unit implementing power control of the processor and at least one logic circuit through a power supply section without performing an arithmetic operation, the power management unit comprising:
a memory storing a plurality of commands, and
a control section implementing power control of the processor and the at least one logic circuit according to the commands stored in the memory.

2. The integrated circuit device according to claim 1, wherein the power management unit is placed in a constant power-on region where power is constantly supplied from the power supply section.

3. The integrated circuit device according to claim 1, wherein the control section of the power management unit includes a sequencer circuit having a state machine and a decoder.

4. The integrated circuit device according to claim 1, wherein the power management unit supplies power to the at least one logic circuit through the power supply section when supplying power to the processor through the power supply section.

5. The integrated circuit device according to claim 1, further comprising:
a clock generation circuit supplying a clock to the processor,
wherein the power management unit controls the clock generation circuit so as to supply a predetermined clock to the processor when supplying power to the processor through the power supply section.

6. The integrated circuit device according to claim 1, further comprising:
a plurality of power switches placed on branch lines that diverge from a line through which power is supplied constantly from the power supply section and are connected to each of the processor and the at least one logic circuit,
wherein the power management unit controls on and off of the power switches.

7. The integrated circuit device according to claim 6, wherein the power management unit and the power switches are placed in a constant power-on region where power is constantly supplied from the power supply section.

8. The integrated circuit according to claim 1, wherein the command stored in the memory instructs the power management unit to implement the power control of the processor and the at least one logic circuit in a predetermined way.

9. The integrated circuit according to claim 1, wherein a plurality of power supply sections are provided, and the power supply section for the processor is different from the power supply section for the power management unit.

10. The integrated circuit according to claim 1, wherein no arithmetic circuit is included in the power management unit.

11. The integrated circuit according to claim 1, wherein a circuit size of the power management unit is smaller than a circuit size of the processor.

12. The integrated circuit according to claim 1, wherein the power management unit performs the power control of the processor and the at least one logic circuit while no power is supplied to the processor from the power supply section.

13. The integrated circuit according to claim 1, further comprising;
a clock generator that generates a clock supplied to the processor,
wherein the power management unit directs the clock generator to change its clock frequency.

14. An integrated circuit device, comprising:
a processor having an arithmetic circuit;
at least one logic circuit having a register; and
a power management unit implementing power control of the processor and the at least one logic circuit through a power supply section without performing an arithmetic operation, the power management unit comprising:
a memory storing a plurality of commands; and
a control section implementing power control of the processor and the at least one the logic circuit according to the commands stored in the memory,
wherein the power management unit performs writing of a predetermined value to the register of the at least one logic circuit when supplying power to the processor through the power supply section.

15. An integrated circuit device comprising:
a processor having an arithmetic circuit; and
a programmable sequencer implementing power control of the processor and at least one other circuit through a power supply section without performing an arithmetic operation,
wherein the programmable sequencer performs initialization of the at least one other circuit in the integrated circuit device in parallel with supplying power to the processor through the power supply section.

16. The integrated circuit device according to claim 15, wherein the initialization comprises writing of an initial value to a register included in the at least one other circuit in the integrated circuit device.

17. The integrated circuit device according to claim 15, wherein the programmable sequencer comprises:
a memory storing a plurality of commands, and
a control section implementing power control of the processor and the at least one logic circuit according to the commands stored in the memory.

* * * * *